(12) United States Patent
Yuelai et al.

(10) Patent No.: US 10,471,603 B2
(45) Date of Patent: Nov. 12, 2019

(54) SYSTEM FOR CONVEYING WORKPIECE HAVING EXTERNAL FORCE MONITORING FUNCTION

(71) Applicant: FANUC CORPORATION, Yamanashi (JP)

(72) Inventors: Wang Yuelai, Yamanashi (JP); Yasuhiro Naitou, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 718 days.

(21) Appl. No.: 14/708,411

(22) Filed: May 11, 2015

(65) Prior Publication Data

US 2015/0328771 A1    Nov. 19, 2015

(30) Foreign Application Priority Data

May 14, 2014 (JP) ................. 2014-100919

(51) Int. Cl.
*B25J 13/08* (2006.01)
*B25J 9/16* (2006.01)

(52) U.S. Cl.
CPC ........... *B25J 13/085* (2013.01); *B25J 9/1674* (2013.01); *G05B 2219/40582* (2013.01); *Y10S 901/02* (2013.01); *Y10S 901/34* (2013.01); *Y10S 901/46* (2013.01)

(58) Field of Classification Search
CPC ........ B25J 9/023; B25J 9/1638; B25J 9/1641; B25J 9/1674; B25J 15/0057; B25J 19/06; H02K 11/0068; H02K 11/0084

USPC ......... 318/560, 568.2, 568.21; 414/590, 591, 414/751.1, 753.1; 700/256, 258, 261; 901/9, 28, 46

See application file for complete search history.

(56) References Cited

U.S. PATENT DOCUMENTS

| | | | |
|---|---|---|---|
| 6,331,095 B1 * | 12/2001 | Hiroki | H01L 21/68742 414/222.01 |
| 6,473,672 B1 | 10/2002 | Holdgreve | |
| 2011/0270444 A1 | 11/2011 | Nagata et al. | |
| 2013/0006422 A1 | 1/2013 | Komatsu | |

FOREIGN PATENT DOCUMENTS

| | | |
|---|---|---|
| CN | 103025492 A | 4/2013 |
| JP | 61-157527 U | 9/1986 |
| JP | 62-96225 A | 5/1987 |
| JP | 9-146624 A | 6/1997 |

(Continued)

*Primary Examiner* — Mark C Hageman
*Assistant Examiner* — Brendan P Tighe
(74) *Attorney, Agent, or Firm* — Hauptman Ham, LLP (57) ABSTRACT

A conveying system includes an external force calculation unit which calculates an external force applied to a robot based on a force or torque applied to the robot detected by a force detection unit, and workpiece parameters changed in accordance with the holding state of a workpiece, and a robot stopping unit which stops the robot when the calculated external force exceeds a threshold. The conveying system further includes a relative movement unit which moves the held workpiece and a workpiece support relative to each other. By the relative movement unit, the workpiece and workpiece support are moved relative to each other without changing the position and posture of the robot.

1 Claim, 9 Drawing Sheets

(56) References Cited

FOREIGN PATENT DOCUMENTS

| | | |
|---|---|---|
| JP | 2005-1070 A | 1/2005 |
| JP | 2008-188722 A | 8/2008 |
| JP | 2010-188504 A | 9/2010 |
| JP | 2013-132726 A | 7/2013 |
| WO | 2012/077335 A1 | 6/2012 |

* cited by examiner

SYSTEM FOR CONVEYING WORKPIECE HAVING EXTERNAL FORCE MONITORING FUNCTION

RELATED APPLICATIONS

The present application claims priority of Japanese Application Number 2014-100919, filed May 14, 2014, the disclosure of which is hereby incorporated by reference herein in its entirety.

BACKGROUND ART

1. Technical Field

The present invention relates to a conveying system which conveys a workpiece by a robot.

2. Description of the Related Art

A known robot system which includes an external force monitoring function for monitoring a force or torque (hereinafter referred to as "external force") which is applied to a robot from the outside in order to prevent the robot from being in contact with an object or operator around the robot to cause a serious accident. In such a robot system, safety is ensured by stopping a robot when a detected external force exceeds a predetermined threshold. It is important to take such a safety measure, in particular, in the case of a human-cooperative robot in which a robot and an operator share a workspace.

An external force applied to a robot is detected by a force sensor provided in a base unit of the robot, for example. Specifically, an external force is calculated by subtracting forces (gravity and inertial force) caused by a robot itself when no external force is applied, from a detection value of the force sensor.

In the case of a robot which is used to hold and convey a workpiece to a predetermined position, the detection value of the force sensor is changed by the influence of the workpiece when the robot is holding the workpiece. Therefore, the influence of the workpiece needs to be taken into account to monitor the external force. Specifically, by setting the mass, the center of mass, and the inertia matrix of the workpiece as parameters of the workpiece, forces (gravity and inertial force) applied to the robot caused by the workpiece are calculated. Forces caused by the workpiece are then subtracted from the detection value of the force sensor to calculate an external force.

Figure 7A:
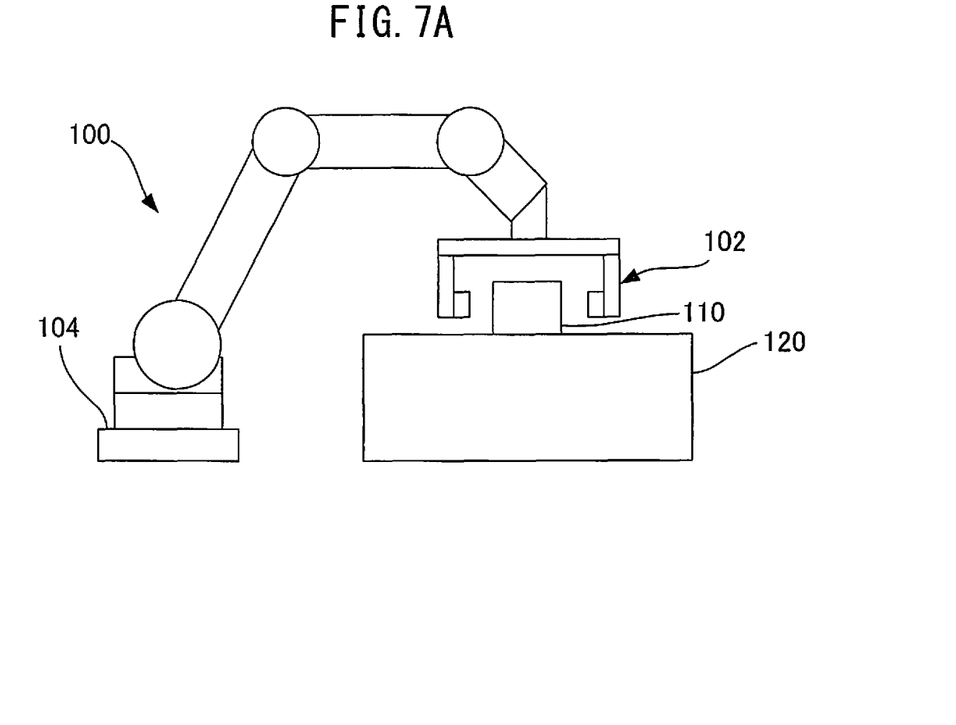
FIG. 7A is a schematic diagram illustrating a conveying system according to a related art.
Figure 7B:
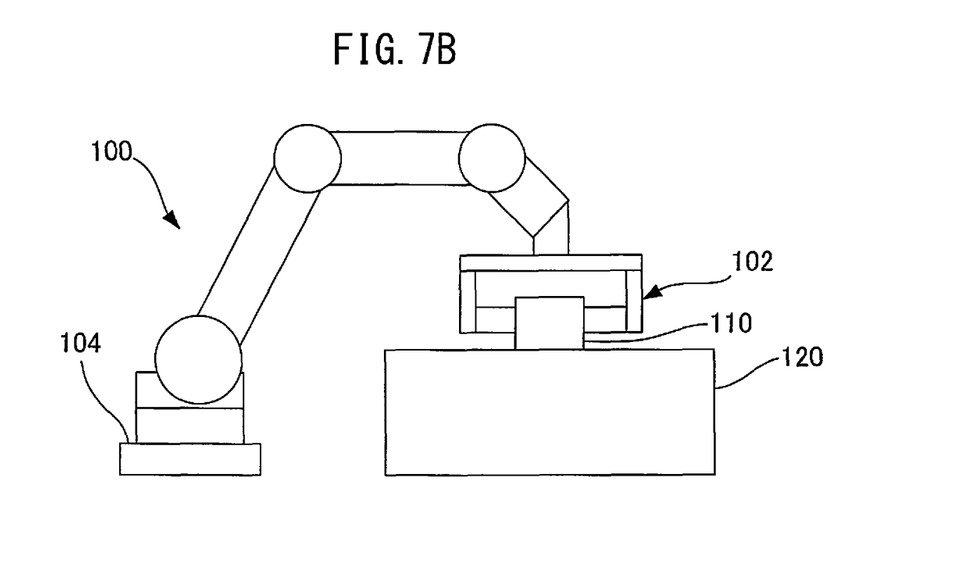
FIG. 7B is a schematic diagram illustrating the conveying system according to the related art.
Figure 7C:
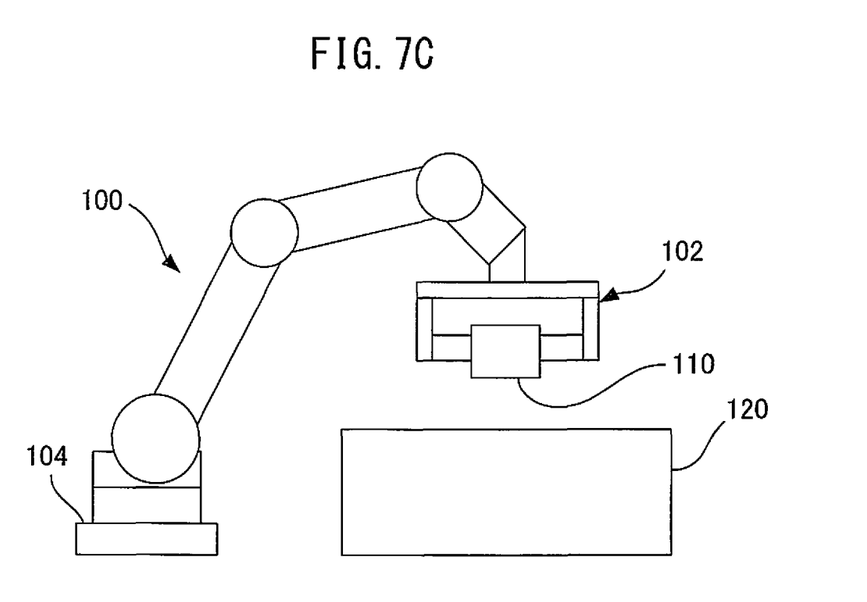
FIG. 7C is a schematic diagram illustrating the conveying system according to the related art.

FIGS. 7A to 7C are drawings illustrating the manner in which a robot 100 according to a related art holds and conveys a workpiece 110. The robot 100 includes a hand 102 at a tip end of an arm, and can hold a workpiece 110 by the hand 102. The robot 100 includes in a base unit a force sensor 104 which detects a force applied to the robot 100.

FIG. 7A illustrates the robot 100 which is positioned at a position where the hand 102 can hold the workpiece 110. The hand 102 is in an open position in which the hand 102 is distant from the workpiece 110 in a horizontal direction. The workpiece 110 is thus supported only by a workpiece support 120.

FIG. 7B illustrates the robot 100 whose hand 102 is moved in the horizontal direction to hold the workpiece 110. The workpiece 110 is still on the workpiece support 120 in the same way as the state in FIG. 7A. The workpiece 110 is thus still supported only by the workpiece support 120.

FIG. 7C illustrates the robot 100 whose position and posture are changed so that the hand 102 moves upward in a vertical direction. In this case, the workpiece 110 is not in contact with the workpiece support 120. The workpiece 110 is therefore supported only by the hand 102, and thus only by the robot 100.

In the following example described with reference to FIGS. 7A to 7C, the mass of the robot 100 is 200 kg, and the mass of the workpiece 110 is 20 kg. For the sake of simplicity, it is assumed that the robot 100 is static. In other words, an inertial force when the robot 100 or workpiece 110 moves is ignored.

In the state of FIG. 7A, the robot 100 is not in contact with the workpiece 110, and a detection value of the force sensor 104 is not influenced by the workpiece 110. Therefore, when no external force is applied, the detection value of the force sensor 104 is equal to the mass of the robot 100, which is 200 kg. In this case, the external force is calculated by subtracting the mass of the robot 100 (=200 kg) from the detection value of the force sensor 104 (=200 kg) to be 0 kg. Since no external force is applied in reality, the calculated value of the external force (0 kg) is correct.

Although, in the state of FIG. 7B, the hand 102 applies forces in the horizontal direction to hold the workpiece 110, no force is applied in the vertical direction. Therefore, when no external force is applied, the detection value of the force sensor 104 is equal to the mass of the robot 100, which is 200 kg.

On the other hand, since the robot 100 holds the workpiece 110, the external force is calculated in consideration of an influence of the workpiece 110 in accordance with the workpiece parameters. In other words the external force is calculated by subtracting the mass of the robot 100 (200 kg) and the mass of the workpiece 110 (20 kg) from the detection value of the force sensor 104 (200 kg) to be −20 kg. In this case, since no external force is actually applied, the calculated value of the external force (−20 kg) is incorrect. Therefore, in such cases, the external force applied to the robot 100 cannot be correctly detected.

In the state of FIG. 7C, the detection value of the force sensor 104 is 220 kg. The external force is obtained by subtracting the mass of the robot 100 (200 kg) and the mass of the workpiece 110 (20 kg) from the detection value (220 kg) of the force sensor 104 to be 0 kg. Therefore, the external force applied to the robot 100 in this case can be correctly detected.

As mentioned above, in a conventional method, an external force cannot be correctly detected during the process from the time when the workpiece is started to be held (see FIG. 7B) to the time when the workpiece is supported only by the robot (see FIG. 7C), and thus the external force monitoring function is not achieved as intended.

WO 2012/077335 A1 discloses a controller of a robot which maintains a stationary state of the robot when the robot holds an object, or releases the object. According to this related art, the robot can be prevented from moving unexpectedly when parameters are switched in accordance with a change of states of an object being held.

However, in the related art disclosed in WO 2012/077335 A1, safety is not taken into consideration during the process from when a workpiece is held and until the workpiece is supported only by the robot.

Therefore, there is a need for a conveying system in which contact accidents are prevented to secure safety during a process from when a robot holds a workpiece and until the robot supports the workpiece.

SUMMARY OF INVENTION

According to a first aspect of the present invention, there is provided a conveying system configured to convey a workpiece by a robot, the conveying system comprising: a robot including a tool which can hold a workpiece; a workpiece support configured to support the workpiece which has not been conveyed; a force detection unit configured to detect a force or torque applied to the robot; a parameter changing unit configured to change workpiece parameters so as to calculate a force or torque applied to the robot caused by the workpiece, according to a holding state of the workpiece; an external force calculation unit configured to calculate an external force applied to the robot, based on the force or torque applied to the robot and detected by the force detection unit and the workpiece parameters; a robot stopping unit configured to stop the robot when the external force calculated by the external force calculation unit exceeds a threshold; and a relative movement unit configured to move the workpiece held by the tool and the workpiece support, wherein the relative movement unit is configured to move the workpiece and the workpiece support relative to each other without changing a position and posture of the robot.

According to a second aspect of the present invention, in the conveying system according to the first aspect, the relative movement unit is configured to move the workpiece support away from the workpiece held by the tool.

According to a third aspect of the present invention, in the conveying system according to the first aspect or second aspect, the relative movement unit is configured to move the tool such that the workpiece held by the tool is moved from the workpiece support.

According to a fourth aspect of the present invention, in the conveying system according to any one of the first to third aspects, the tool is a robot hand.

These and other objects, features and advantages of the present invention will become more apparent in light of the detailed description of exemplary embodiments thereof as illustrated in the drawings.

DETAILED DESCRIPTION OF THE INVENTION

Embodiments of the present invention will be described with reference to the accompanying Drawings. Constituent elements of the illustrated embodiments are changed in size as necessary to facilitate understanding of the present invention. For the same or corresponding constituent elements, the same reference numerals are used throughout a plurality of embodiments.

Figure 1A:
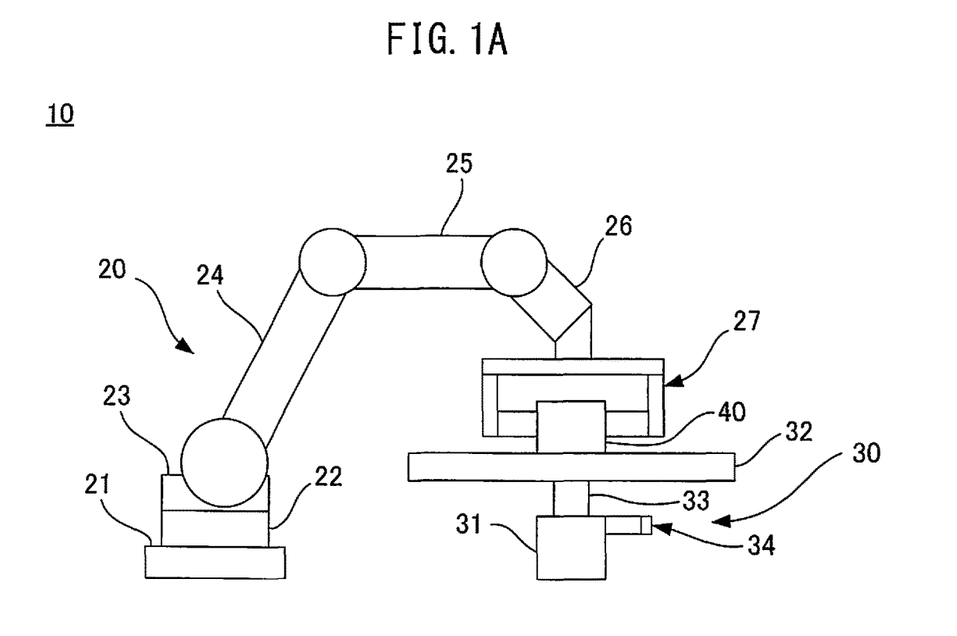
FIG. 1A is a schematic diagram illustrating a conveying system according to a first embodiment.
Figure 1B:
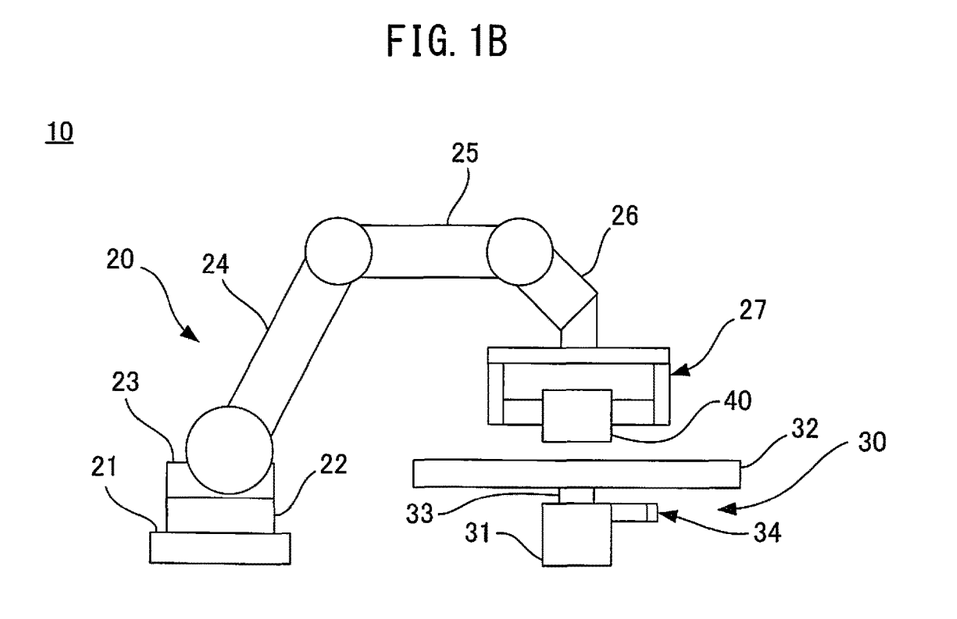
FIG. 1B is a schematic diagram illustrating the conveying system according to the first embodiment.

FIG. 1A and FIG. 1B are schematic diagrams illustrating a conveying system 10 according to a first embodiment. The conveying system 10 includes: a robot 20; and a workpiece support 30 which is arranged in a movable range of the robot 20 and on top face of which a workpiece 40 is disposed. The robot 20 is, for example, a vertical articulated robot as illustrated.

In one embodiment, the robot 20 is provided on a force sensor 21 which detects a force to be applied to the robot 20. The robot 20 includes: a base 22 which is attached to the force sensor 21; a body unit 23 which is rotatably attached to the base 22 such that the body unit 23 can rotate around a rotation shaft extending in a vertical direction; a lower arm 24 which is rotatably attached to the body unit 23 at one end of the lower arm 24; an upper arm 25 which is rotatably attached to the lower arm 24 at the other end of the lower arm 24; and a wrist 26 which is rotatably attached to the upper arm 25 at the tip of the upper arm 25. Each joint of the robot 20 is driven by a servomotor and the robot can move to have various positions and postures. Since such a configuration of the robot 20 is well-known, a detailed explanation of the configuration is omitted herein.

The wrist 26 of the robot 20 is provided with a tool for releasably holding a workpiece 40. In the illustrated embodiment, the tool is a hand 27 which can be opened and closed to releasably hold the workpiece 40. The hand 27 is, for example, a hydraulic or pneumatic hand or an electrically-powered hand which is opened or closed by a servomotor. FIG. 1A illustrates a state in which the workpiece 40 is held by the hand 27 which is driven in a closing direction.

A tool which can hold the workpiece 40 may be in other forms rather than a hand. For example, the tool may be a suction tool in which the workpiece 40 is sucked by utilizing a negative pressure or a magnet.

The workpiece support 30 includes: a seat 31 which is fixed to a floor surface; a supporting unit 32 which extends at a position upwardly distant from the seat 31; and a support column 33 which is provided between the seat 31 and the supporting unit 32. The supporting unit 32 is in the form of a table, and configured to allow the workpiece 40 to be mounted on the supporting unit 32. The support column 33 can move upward and downward in the vertical direction by a motor 34, whereby the supporting unit 32 can move toward the seat 31 or away from the seat 31.

FIG. 1B illustrates a state in which the support column 33 is moved downward so that the supporting unit 32 of the workpiece support 30 is distant from the workpiece 40. In other words, in the state of FIG. 1B, the workpiece 40 is supported by the hand 27, and the robot 20 is subjected to a gravity force which is applied to the workpiece 40. In this way, since the present embodiment includes the supporting unit 32 which can move upward and downward, the workpiece 40 can be separated from the workpiece support 30 without changing the position and posture of the robot 20.

Figure 2:
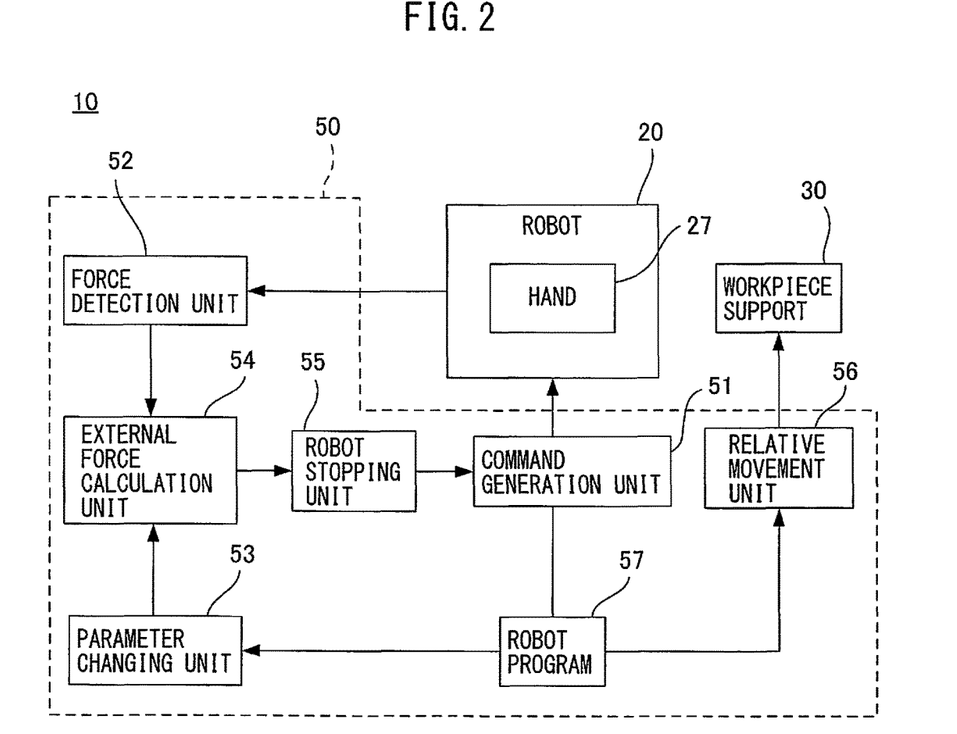
FIG. 2 is a block diagram illustrating a function of a conveying system according to one embodiment.

FIG. 2 is a block diagram illustrating a function of the conveying system 10 according to one embodiment. As illustrated, the conveying system 10 includes: a robot 20; a workpiece support 30; and a controller 50 which controls the robot 20 and workpiece support 30. The controller 50 includes: a command generation unit 51; a force detection unit 52; a parameter changing unit 53; an external force calculation unit 54; a robot stopping unit 55; and a relative movement unit 56. The controller 50 is a commonly-used personal computer, which has a hardware configuration composed of: a CPU which executes a variety of calculations; a RAM which temporarily stores an operation result of the CPU; a ROM which stores various programs and parameters; input devices such as a mouse and a keyboard; a display device which displays various information; or the like. In one embodiment, a controller which controls the robot 20 and a controller which controls a workpiece support 30 may be provided separately.

The command generation unit 51 generates a command for the robot 20, for example, in accordance with a predetermined robot program 57. The robot 20 operates according to a command from the command generation unit 51. The command generation unit 51 may generate a command in response to an input signal. For example, the command generation unit 51 generates a command for stopping the robot 20 in response to a stop signal output from the robot stopping unit 55. The command generation unit 51 may be configured to generate a command in accordance with information which is input by an operator using an input device.

The force detection unit 52 detects a force applied to the robot 20. The robot 20 according to the embodiment represented by FIG. 1A and FIG. 1B includes the force sensor 21 at the base unit. The force detection unit 52 can therefore detect a force applied to the robot 20 by the force sensor 21. The force detected by the force sensor 21 includes an external force applied to the robot 20 from the outside, as well as a gravity force and an inertial force applied to the robot 20. When the robot 20 holds the workpiece 40, a force applied to the robot 20 caused by a gravity force and an inertial force which are applied to the workpiece 40 is further detected by the force sensor 21. In another embodiment, the force sensor 21 may be attached to a portion other than the base unit of the robot 20, such as the lower arm 24, the upper arm 25, or the wrist 26, or alternatively may be incorporated therein. In any of the above mentioned cases, the force sensor 21 can detect a force applied to the robot 20 on the tip side from a portion where the force sensor 21 is attached. In another embodiment, the force detection unit 52 may be configured to detect a torque applied to the robot 20. In this case, in place of the force sensor 21, a plurality of torque sensors which detect a torque applied to a joint of the robot 20 are provided.

The parameter changing unit 53 changes workpiece parameters used for calculating a force or a torque applied to the robot 20 caused by a gravity force and an inertial force applied to the workpiece 40, according to the holding state of the workpiece 40. The workpiece parameters may include information of the mass, the center of mass, and the inertia matrix of the workpiece 40. For example, when the workpiece 40 is not held, the parameter changing unit 53 changes the parameter of each of the mass, center of mass, and inertia matrix of the workpiece 40 to zero. When the workpiece 40 is held, the parameter changing unit 53 acquires workpiece parameters from the robot program 57 to replace current workpiece parameters. In another embodiment, the parameter changing unit 53 may change the workpiece parameters in accordance with workpiece parameters which are input by an operator using an input device, or may change the workpiece parameters in response to a signal input from an external device.

The external force calculation unit 54 calculates an external force (force or torque) which is externally applied to the robot 20. When the robot 20 holds the workpiece 40, the external force calculation unit 54 also calculates an external force which is applied to the workpiece 40 being held. The external force calculation unit 54 calculates an external force applied to the robot 20, for example, by subtracting a force or torque caused by a gravity force and an inertial force applied to the robot 20 when no external force is applied, from a detection value of the force detection unit 52. When the robot 20 holds the workpiece 40, a force or torque applied to the robot 20 caused by a gravity force and an inertial force applied to the workpiece 40 when no external force is applied is further subtracted from the detection value of the force detection unit 52.

The robot stopping unit 55 compares an external force calculated by the external force calculation unit 54 with a predetermined threshold to output a stop signal to the command generation unit 51 when the calculated value of the external force exceeds the threshold. The command generation unit 51 generates, in response to the stop signal, a stop command which stops the robot 20. In one embodiment, the stop command may include a retraction command by which the robot 20 is moved over a predetermined distance in a direction in which an external force is applied before the robot 20 is stopped. In this case, since the robot 20 stops after the robot 20 retracts such that the external force is reduced, interference between the robot 20 and an object or operator around the robot 20 can be immediately resolved. A serious accident can therefore be more surely prevented.

The relative movement unit 56 moves the workpiece 40 and the workpiece support (in particular, the supporting unit 32) 30 relative to each other so as to change the positional relationship between them. For example, in the embodiment represented by FIG. 1A and FIG. 1B, the relative movement unit 56 drives the motor 34 of the workpiece support 30 to move the supporting unit 32 upward and downward in the vertical direction to realize desired relative movement.

Figure 3:
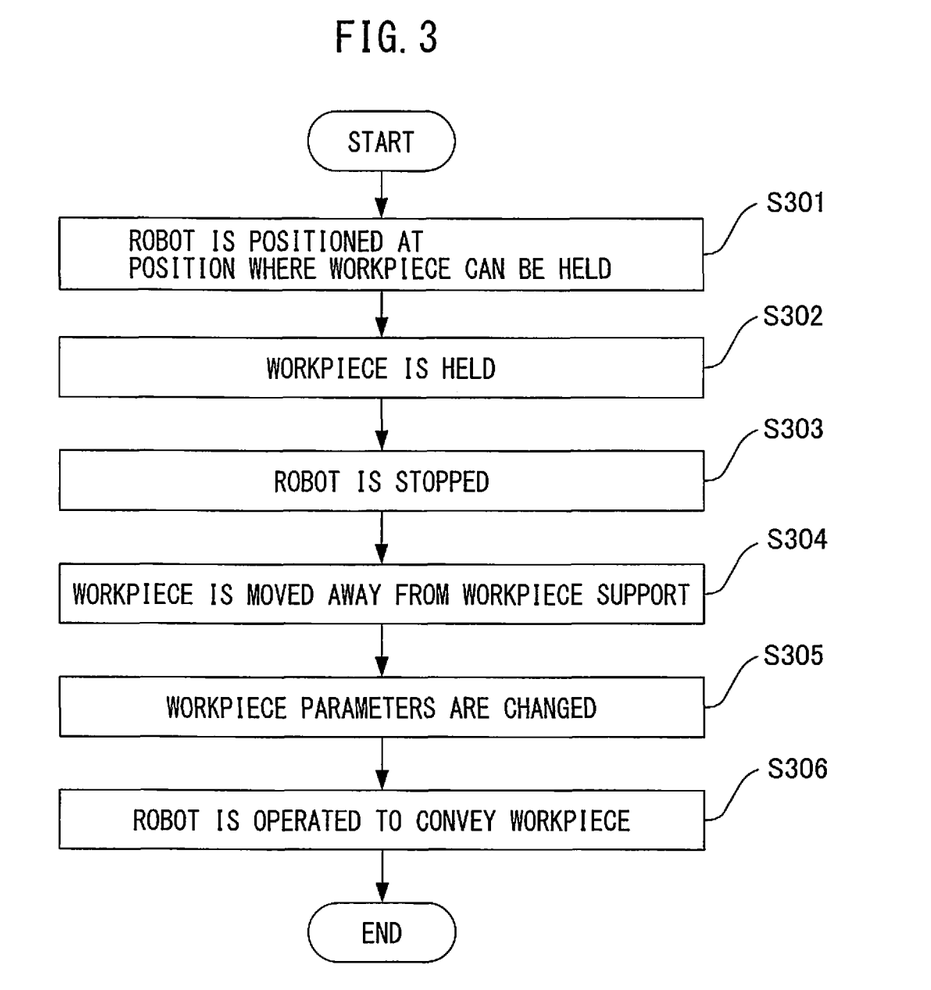
FIG. 3 is a flow chart illustrating a sequence of processes carried out by a conveying system according to one embodiment.

With reference to FIG. 3, operation of the conveying system 10 will be described. FIG. 3 is a flow chart illustrating a sequence of processes carried out by a conveying system 10 according to one embodiment. At step S301, the robot 20 is moved to a position where the workpiece 40 can be held by the hand 27 of the robot 20. In other words, the robot 20 is positioned at a position where the workpiece 40 can be held by moving the hand 27 in a closing direction without changing the position and posture of the robot 20.

Next, at step S302, the hand 27 is driven, and thus the workpiece 40 is held by the hand 27 (see FIG. 1A). For example, a reaction force which is applied to the hand 27 when the workpiece 40 is held is detected, and it is assumed that the workpiece 40 is held when the reaction force reaches a threshold. Alternatively, it may be assumed that the holding operation of the workpiece 40 is completed when the hand 27 reaches a predetermined closing position, which depends on the shape of the workpiece 40.

At step S303, the robot 20 is stopped. When the robot 20 is in a stopped state, for example, the command generation unit 51 is restricted to generate a new torque command or electric current command. This allows the position and posture of the robot 20 to be maintained. According to the present embodiment, the stopped state of the robot 20 is maintained until immediately before a conveying step is started at step S306.

At step S304, the workpiece 40 and the workpiece support 30 are moved relative to each other by the relative movement unit 56 such that the workpiece 40 is distant from the workpiece support 30 (see FIG. 1B). For example, as can be seen in comparison of FIG. 1A with FIG. 1B, the workpiece 40 is separated from the workpiece support 30 by moving the supporting unit 32 of the workpiece support 30 downward.

Next, at step S305, workpiece parameters are changed so as to correspond to a state in which the workpiece 40 is held. By changing the workpiece parameters, the external force calculation unit 54 can calculate an external force taking into account a force or torque applied to the robot 20 caused by a gravity force and an inertial force applied to the workpiece 40, and as a result, the external force can be accurately calculated. The workpiece parameters are input, for example, from the robot program 57 (see FIG. 2).

At step S306, the robot 20 is driven, and thus the workpiece 40 held by the hand 27 is conveyed to a predetermined position, for example, to a work table or a conveyor. During the conveying process at step S306, an external force monitoring function which utilizes the force detection unit 52, the external force calculation unit 54, and the robot stopping unit 55 is enabled.

The aforementioned embodiment has the following advantages.

(1) The position and posture of a robot are not changed from when the robot holds a workpiece until when the workpiece is supported only by the robot. During these processes, accidents involving contact between the robot and an object or operator around the robot can therefore be prevented.

(2) The relative movement of the workpiece with respect to the workpiece support is caused only by the downward motion of the workpiece support in the vertical direction, which is independent of the robot. Since the motion of the workpiece support is relatively simple, as compared to the case in which the position and posture of the robot are changed, an operator can predict the motion of the workpiece support accurately. For example, a risk of contact accidents can thus be easily assessed, and a safety measure can be implemented easily, for example, an operator may temporarily move away from the workpiece support.

(3) In a process in which the robot is moved to a position where a workpiece can be held, and in a process in which the held workpiece is conveyed to a predetermined position, an external force applied to the robot is monitored, and the robot is stopped as necessary. Therefore, even if the robot comes in contact with an object or operator around the robot while the robot is in motion, serious accidents can be prevented.

Figure 4A:
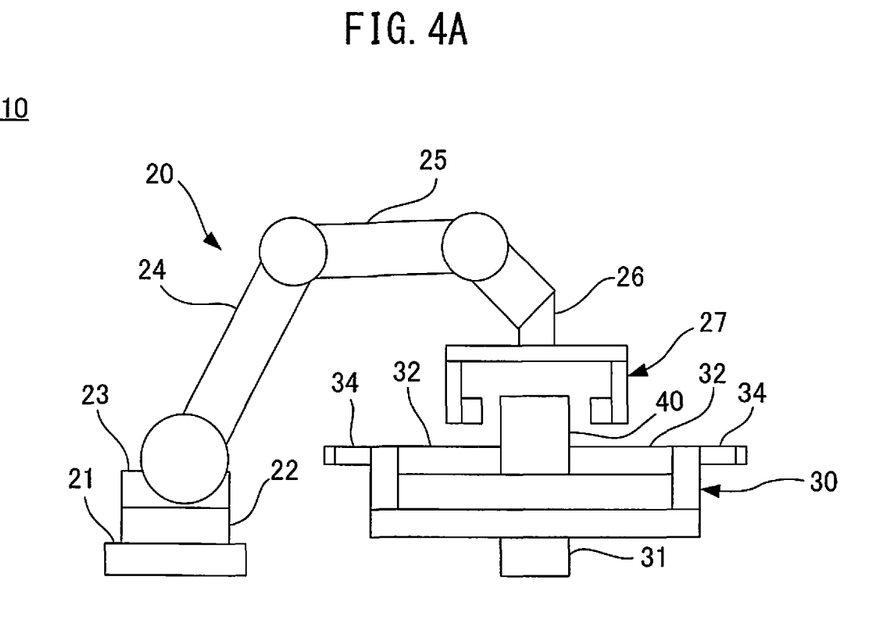
FIG. 4A is a schematic diagram illustrating a conveying system according to a second embodiment.
Figure 4B:
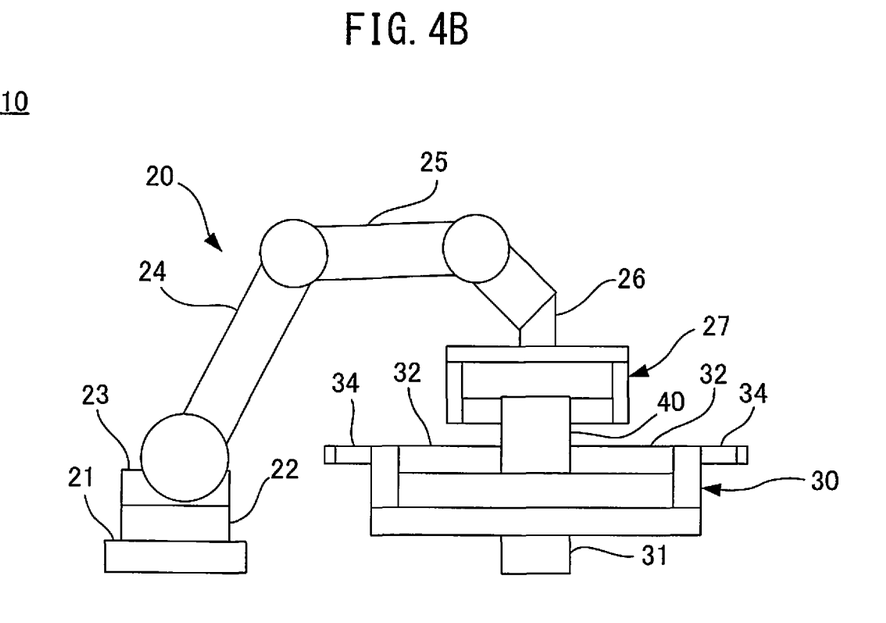
FIG. 4B is a schematic diagram illustrating the conveying system according to the second embodiment.
Figure 4C:
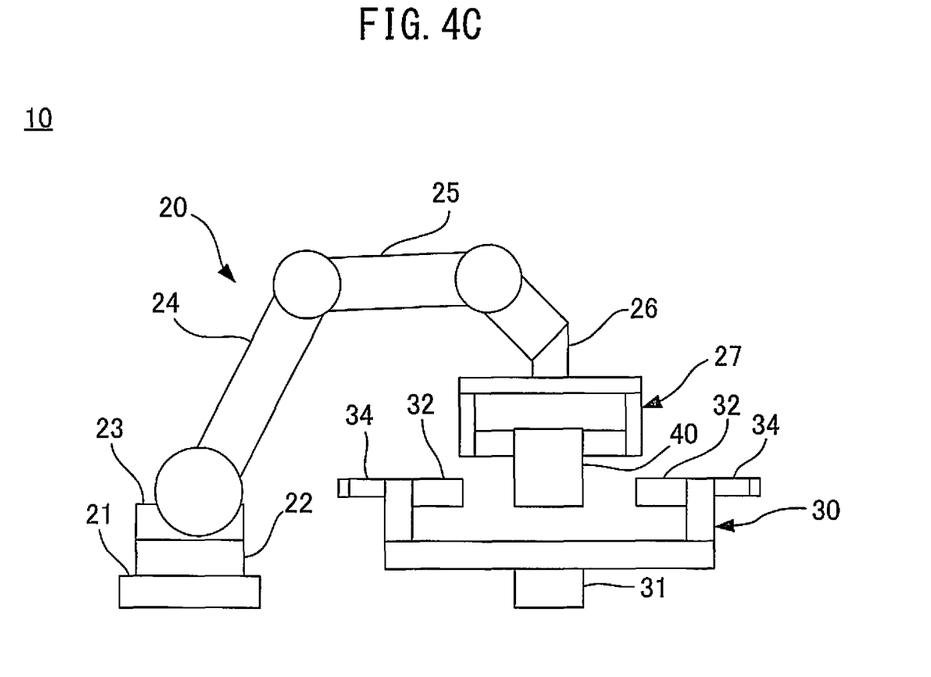
FIG. 4C is a schematic diagram illustrating the conveying system according to the second embodiment.

FIGS. 4A to 4C are schematic diagrams illustrating a conveying system 10 according to a second embodiment. In the present embodiment, the supporting unit 32 of the workpiece support 30 is configured to releasably hold the workpiece 40. Specifically, a pair of supporting units 32 extending generally in the horizontal direction move such that the supporting units 32 come closer to each other or separate from each other so as to hold or release the workpiece 40. The supporting units 32 are driven by the motor 34. In another embodiment, the supporting units 32 may be configured to be opened and closed by hydraulic or pneumatic pressure.

FIG. 4A illustrates a conveying system 10 in which the robot 20 is positioned at a position where the workpiece 40 can be held. In this state, the workpiece 40 is held between the supporting units 32 of the workpiece support 30. In other words, the workpiece 40 is supported only by the workpiece support 30. FIG. 4B illustrates a state in which the hand 27 of the robot 20 is closed to hold the workpiece 40. In this state, the workpiece 40 is still supported by the workpiece support 30.

FIG. 4C illustrates a state in which the supporting units 32 of the workpiece support 30 are moved away from the workpiece 40. At this time, the workpiece 40 is supported only by the hand 27, and thus only by the robot 20.

The conveying system 10 according to the present embodiment functions in the same manner as the aforementioned embodiment, except that the supporting units 32 of the workpiece support 30 are movable in the horizontal direction so as to move the workpiece 40 away from the workpiece support 30. The conveying system 10 having such a configuration thus attains the aforementioned advantageous effects (1) to (3).

Figure 5A:
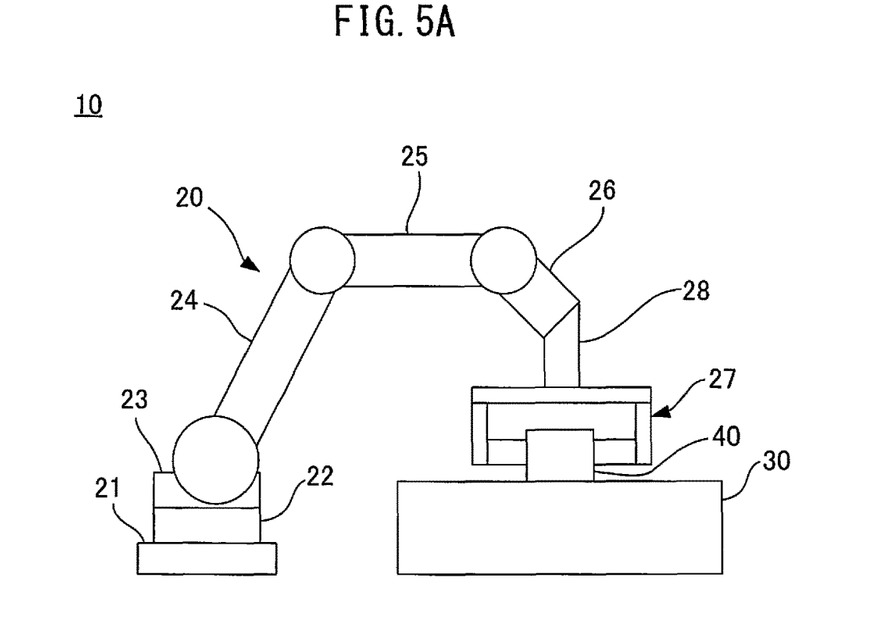
FIG. 5A is a schematic diagram illustrating a conveying system according to a third embodiment.
Figure 5B:
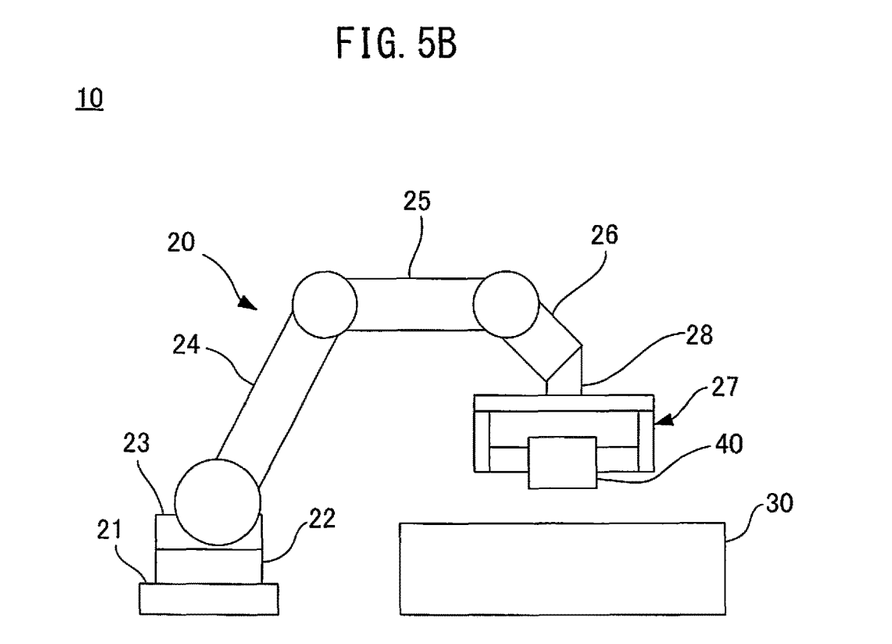
FIG. 5B is a schematic diagram illustrating the conveying system according to the third embodiment.
Figure 6:
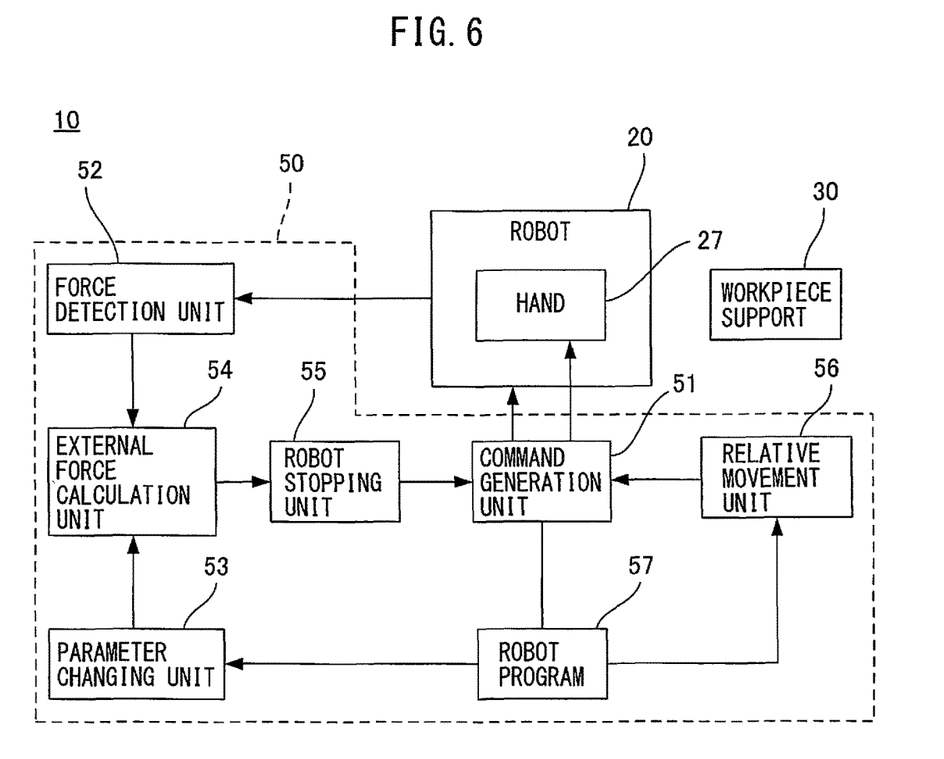
FIG. 6 is a block diagram illustrating a function of a conveying system according to another embodiment.

FIGS. 5A and 5B are schematic diagrams illustrating a conveying system 10 according to a third embodiment. FIG. 6 is a block diagram illustrating a function of the conveying system of the third embodiment. In the present embodiment, unlike the aforementioned embodiment, the relative movement unit 56 does not move the workpiece support 30, but can change the position of the hand 27 of the robot 20. Specifically, the relative movement unit 56 can move the hand 27 in cooperation with the command generation unit 51 which is configured to generate a command for the hand 27.

As can be seen by comparing FIG. 5A and FIG. 5B, the relative movement unit 56 is configured such that the supporting unit 28 of the hand 27 can be extended and contracted by the command generation unit 51. Specifically, the hand 27 can move upward by contracting the supporting unit 28, whereby the workpiece 40 held by the hand 27 is moved away from the workpiece support 30.

Also in the conveying system 10 according to the present embodiment, the position and posture of the robot 20 are not changed from when the hand 27 holds the workpiece 40 until when the hand 27 moves upward and the workpiece 40 is away from the workpiece support 30. The motion of the hand 27 in upward and downward directions is simpler than the cases in which the robot 20 operates, as described above in relation to the motion of the workpiece support 30 with reference to FIG. 1A and FIG. 1B, and FIGS. 4A to 4C. The conveying system 10 having such a configuration can also attain the aforementioned advantageous effects (1) to (3).

In the present embodiment, the workpiece support 30 is a jig in the form of a table on which the workpiece 40 can be mounted, but the workpiece support 30 may not be used, and the workpiece 40 may instead be placed directly on the floor surface. When a plurality of workpieces 40 are piled on one another, another workpiece 40 which is positioned below the workpiece 40 to be held may serve as a workpiece support. In this way, it should be noted that, in relation to the present invention, the term "workpiece support" can be interpreted in a variety of ways.

Although the present invention has been described with reference to an example in which either the hand or the workpiece support is operated, the hand and the workpiece support may be moved relative to each other by operating both of the hand and the workpiece support.

Effect of the Invention

According to the conveying system of the present invention, the workpiece and the workpiece support are moved relative to each other by the relative movement unit while the robot remains still. In other words, the robot does not operate during processes from when the workpiece is held until when the workpiece is supported only by the robot. The robot can therefore be prevented from coming in contact with an object or operator around the robot.

The relative movement of the workpiece and the workpiece support which is carried out by the relative movement unit is simple motion as compared to the motion of the robot. An operator can therefore predict the motion of the conveying system considerably easily, thereby preventing an accident.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A conveying system configured to convey a workpiece by a robot, the conveying system comprising:
   a robot including a tool configured to hold a workpiece;
   a workpiece support configured to support the workpiece which has not been conveyed;
   a force or torque detection unit configured to detect a force or torque applied to the robot;
   a driving mechanism configured to move (a) the workpiece held by the tool and (b) the workpiece support relative to each other; and
   a controller configured to
      change workpiece parameters so as to calculate a force or torque applied to the robot caused by the workpiece, according to a holding state of the workpiece;
      calculate an external force applied to the robot, based on (i) the force or torque applied to the robot and detected by the force or torque detection unit and (ii) the workpiece parameters;
      stop the robot when the calculated external force exceeds a threshold; and
      control the driving mechanism to move the workpiece and the workpiece support relative to each other without changing a position and posture of the robot,
   wherein the workpiece support comprises a pair of supporting units moveable relative to each other in a horizontal direction to grip the workpiece horizontally.

* * * * *